UNITED STATES PATENT OFFICE.

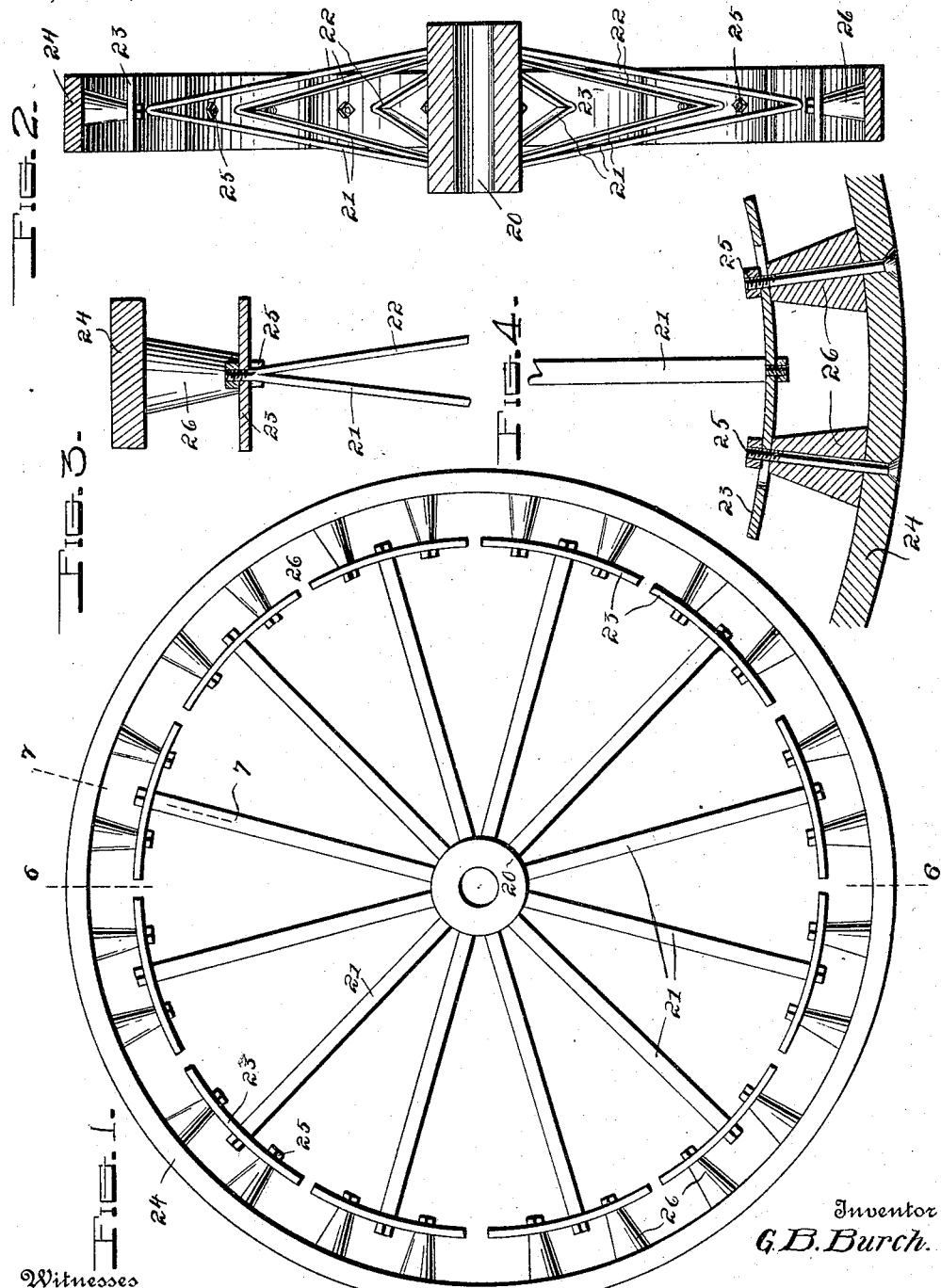

GEORGE B. BURCH, OF BALLAGH, NEBRASKA.

SPRING-WHEEL.

1,212,607. Specification of Letters Patent. Patented Jan. 16, 1917.

Application filed December 27, 1912, Serial No. 738,917. Renewed June 29, 1916. Serial No. 106,619.

*To all whom it may concern:*

Be it known that I, GEORGE B. BURCH, a citizen of the United States, residing at Ballagh, in the county of Garfield, State of Nebraska, have invented certain new and useful Improvements in Spring-Wheels; and I do hereby declare the following to be a full, clear, and exact description of the invention, such as will enable others skilled in the art to which it appertains to make and use the same.

This invention relates to wheels and more particularly to spring wheels whereby all shocks incident to the rim of the wheel coming in contact with a stone or other obstruction will be absorbed by the spring spokes and resilient connections between the outer ends of the spokes and the rim of the wheel.

An object of the invention is to produce a wheel of the above stated character having spokes connected to short springs which are in turn connected to the rim.

Another object is to generally improve the construction and increase the efficiency of spring wheels of this character and at the same time simplify the construction and decrease the cost of manufacturing the same.

With the above and other objects in view, my invention will be more fully described, illustrated in the accompanying drawings which show a preferred embodiment of my device and then specifically pointed out in the claim which is attached to and forms a part of this application.

In the drawings:—Figure 1 is a side elevation of my device. Fig. 2 is a transverse sectional view. Figs. 3 and 4 are fragmental details showing the connection between the rim and the spokes.

Referring to the drawings by reference characters wherein like parts are indicated by like characters throughout the several views: My device comprises a hub 20 having spring spokes 21 and 22 radiating therefrom which are connected at their outer ends to springs 23 at the middle portions of the said springs. These springs are of leaf formation and are slidably mounted on blocks 26 which are of frusto-conical formation and are secured to the rim 24 by bolts 25, which bolts extend up through slots in the ends of the springs 23 and the said springs are held upon the blocks 26 by the engagement of the nuts on the inner ends of the bolts 25.

By securing the spring spokes 21 and 22 to the springs 23 between the ends thereof and by slidably supporting the springs at each of their ends upon the blocks 26 when the load is shifted from one portion of the rim to the other, each spoke as it assumes a vertical position supporting the load will cause the spring member 23 to which it is attached to be bowed downwardly, the ends of said spring at the same time sliding upon the blocks 26. At this time also the spokes 21 and 22 yield and the shock is effectually absorbed.

It will be seen that I have provided a resilient spring wheel of extremely simple construction and which may be employed upon vehicles of various heights and which will be highly efficient in use. Further owing to the extremely small number of parts it will be evident that the entire wheel may be readily and cheaply manufactured and assembled for use, and should any of its parts become worn or broken they may be replaced at small cost.

What I claim is:—

A resilient wheel comprising a hub, spokes radiating from the opposite ends of said hub and having their outer ends connected, a rim having a series of blocks rigidly connected thereto, a series of spring plates having their centers connected to the spokes, said plates having their outer ends slotted adjacent the ends, and bolts passing through said slots into said blocks.

In testimony whereof, I affix my signature, in presence of two witnesses.

GEORGE B. BURCH.

Witnesses:
ADDIE S. BURCH,
PATRICK KENNEDY.

Copies of this patent may be obtained for five cents each, by addressing the "Commissioner of Patents, Washington, D. C."